United States Patent
Schober

(10) Patent No.: US 6,431,826 B1
(45) Date of Patent: Aug. 13, 2002

(54) CENTRIFUGAL PUMP

(75) Inventor: Martin Schober, Molln (AT)

(73) Assignee: TCG Unitech Aktiengesellschaft, Kirchdorf/Krems (AT)

( * ) Notice: Subject to any disclaimer, the term of this patent is extended or adjusted under 35 U.S.C. 154(b) by 35 days.

(21) Appl. No.: 09/590,272

(22) Filed: Jun. 9, 2000

(30) Foreign Application Priority Data

Jun. 10, 1999 (AT) ................................................ 1032/99

(51) Int. Cl.[7] ................................................ F04D 29/18
(52) U.S. Cl. ...................... 415/170.1; 384/540; 384/906
(58) Field of Search .............................. 415/170.1, 229; 384/540, 906, 481, 474, 541, 489

(56) References Cited

U.S. PATENT DOCUMENTS

| | | | |
|---|---|---|---|
| 2,203,525 A | | 6/1940 | DuPree, Jr. |
| 3,711,218 A | * | 1/1973 | Kennel et al. ............... 415/229 |
| 4,917,511 A | * | 4/1990 | Katsube ....................... 384/540 |
| 5,186,068 A | * | 2/1993 | Heller ......................... 384/540 |
| 5,409,350 A | | 4/1995 | Mitchell |
| 5,715,976 A | * | 2/1998 | Kautz ......................... 384/537 |
| 6,029,538 A | * | 2/2000 | Little et al. ................. 384/903 |
| 6,062,812 A | * | 5/2000 | Ozawa ....................... 415/170.1 |
| 6,120,243 A | * | 9/2000 | Tanabe ....................... 415/229 |

FOREIGN PATENT DOCUMENTS

| | | |
|---|---|---|
| FR | 937.265 | 12/1946 |
| FR | 2 353 771 | 6/1976 |

* cited by examiner

*Primary Examiner*—John Kwon
(74) *Attorney, Agent, or Firm*—Dykema Gossett PLLC

(57) ABSTRACT

The invention relates to a centrifugal pump with an impeller which is arranged in a pump housing and can be driven by a shaft which is rotatably held in the pump housing by way of at least one bearing, with the bearing, which is preferably arranged as a roller bearing, being arranged in a bearing holder which is detachably connected with the pump housing. In order to simplify the production of the water pump and to facilitate maintenance it is provided that the bearing holder, at the end facing the impeller, comprises an assembly part which is preferably integrally designed with the pipe section.

25 Claims, 4 Drawing Sheets

CENTRIFUGAL PUMP

BACKGROUND OF THE INVENTION

The invention relates to a centrifugal pump with an impeller arranged in a pump housing, which impeller can be driven by way of a shaft, and the shaft is rotatably held in the pump housing by way of at least one bearing, with the bearing, which is preferably arranged as a roller bearing, being arranged in a bearing holder, with the bearing holder being detachably connected with the pump housing.

In known centrifugal pumps the bearings and axial face seals are directly pressed into the pump housing during production. Pump housing and impeller are supplied as prefabricated units for the respective purpose. In the event of any damage to the bearing it is necessary to exchange the entire pump plus spiral housing. As the pump housing forms the bearing holder, it must be made of metal for the purpose of heat dissipation which has a disadvantageous effect on the amount of production work and the weight of the appliance.

DESCRIPTION OF PRIOR ART

Centrifugal pumps of the kind mentioned above have been disclosed by U.S. Pat. No. 5,409,350 A, FR 2 353 771 A1 and the U.S. Pat. No. 2,203,525 A. In the first two of the aforementioned specifications the bearing holder is connected with the pump housing by separate screws. The bearing holder is inserted into the pump housing from the impeller side. Since the fastening screws of the bearing holder are covered by the impeller, it is necessary to remove the impeller from the shaft for the disassembly and assembly of the bearing holder.

In U.S. Pat. No. 2,203,525 A the bearing holder is inserted into the pump housing from the impeller side and fastened on the pump housing on the side averted from the impeller by a union nut. This design per se would allow removing the bearing holder plus impeller from the pump housing. In order to loosen the union nut it is necessary, however, to previously dismount the parts of the device which are on the side averted from the impeller such as drive wheel, drive motor or the like. FR 937 265 A also shows a similar design.

SUMMARY OF THE INVENTION

It is the object of the present invention to avoid such disadvantages and to provide a centrifugal pump which is easy to produce and service.

This is performed in accordance with the invention in such a way that the bearing holder, at the end facing the impeller, comprises an assembly part which is preferably integrally designed with the pipe section. A very simple disassembly of the bearing holder which is inserted into the pump housing from the impeller side is enabled by the assembly part. The actuation of the assembly part is particularly preferably possible even when the impeller has been inserted.

The bearing holder is used for receiving the bearing and for dissipating the bearing heat. The pump housing per se can be made of any desirable material, e.g. aluminum, magnesium or even of plastic. It is preferably provided that the bearing holder is provided with a substantially cylindrical pipe section for receiving the bearing. The inside jacket of the pipe section is provided with a press or loose fit and is used for receiving the bearing. The pipe section is additionally used to carry off leakages. It is provided for this purpose that the inside jacket of the pipe section is at least provided with one leakage duct arranged as an axial groove.

In order to enable the discharge of the leakages irrespective of the installed position of the pipe section, it is particularly appropriate to provide the inside jacket of the pipe section with several leakage ducts which are evenly distributed over the circumference and arranged as axial grooves.

It can further be provided that a sealing element, preferably an axial face seal, is pressed into the bearing holder in the zone of the impeller-side end of the bearing holder. It is preferably provided that the bearing holder is provided with a collar in the transitional region between pipe section and assembly part onto which the sealing is pressed.

At the impeller-side end, the bearing holder is sealed off from the receiving zone of the pump housing by sealing means. The bearing holder is further provided with a support collar in the zone of the impeller-side end, up to which the bearing holder is pushed onto the pump housing. The sealing means, e.g. an O-ring seal, a sealing lacquer or microencapsulation of the screw thread, can ensure the protection against torsion. Protection against torsion can also be provided by a surface knurling of the face of the support collar of the bearing holder against the receiving area of the pump housing.

In a particularly preferable embodiment of the invention it is provided that the pipe section is provided with a thread on its outside jacket. The bearing holder is screwed into the receiving zone of the pump housing by way of a thread, thus producing a secure, but still detachable connection between the bearing holder and the pump housing.

In order to ensure a particularly simple assembly and disassembly, it is provided that the assembly part preferably comprises a positive-locking zone, formed by a hexagon, as a working surface for a tool, with the smallest distance of the positive-locking zone from the shaft axis being larger than the largest radius of the impeller. The profile of the assembly part is thus substantially adjusted to the profile of the impeller in order to reduce clearance volumes to a minimum. It can be provided in an impeller with flow conduits which are inclined with respect to a normal plane from the rotational axis that the assembly part is provided with a face surface which is inclined towards the pipe section with respect a normal plane from the shaft axis.

In a further, highly preferably embodiment it is provided that the outside jacket of the pipe section is provided with a press fit and the bearing holder is pressed into the cylindrical receiving zone of the pump housing. The bearing holder is pressed in this process into the cylindrical receiving zone of the pump housing right up to the limit stop formed by the support collar. Instead of a press fit it is possible that the outside jacket of the pipe section is provided with a loose fit and is torsionally secured against the pump housing by way of a securing screw. In order to allow the attack of pressing or pushing tools on the bearing holder, it is provided that for the purpose of assembly of the bearing holder several axial mounting openings are formed in the impeller, preferably in the zone of the support collar, and the mounting openings are sealed off by sealing means. Sealing lacquer can be used for instance as a sealing means for the mounting openings. Any later disassembly of the bearing holder can be performed by means of suitable withdrawal tools.

It is particularly favorable when the pump housing receiving the bearing holder is formed by the spiral housing of the centrifugal pump.

The invention can be employed highly advantageously in a centrifugal pump for an internal combustion engine, which pump is arranged as a coolant pump and in which the spiral housing is arranged integrally with the oilpan. The oilpan plus spiral housing can be produced independent from the remaining elements of the centrifugal pump. The shaft, the bearing and the impeller are prefabricated and assembled, and are screwed or pressed into the spiral housing of the oilpan as a unit. In the case of any damage to the bearing or impeller in the course of the service life, only the pump unit consisting of bearing holder, bearing, shaft and impeller needs to be changed, but not the spiral housing formed by the oilpan.

The bearing holder leads to the advantage that there is considerable freedom in the production and the selection of material for the spiral housing, so that the spiral housing can be made integrally with the other parts of the machine from any desired material.

DETAILED DESCRIPTION OF THE PREFERRED EMBODIMENTS

Figure 1:
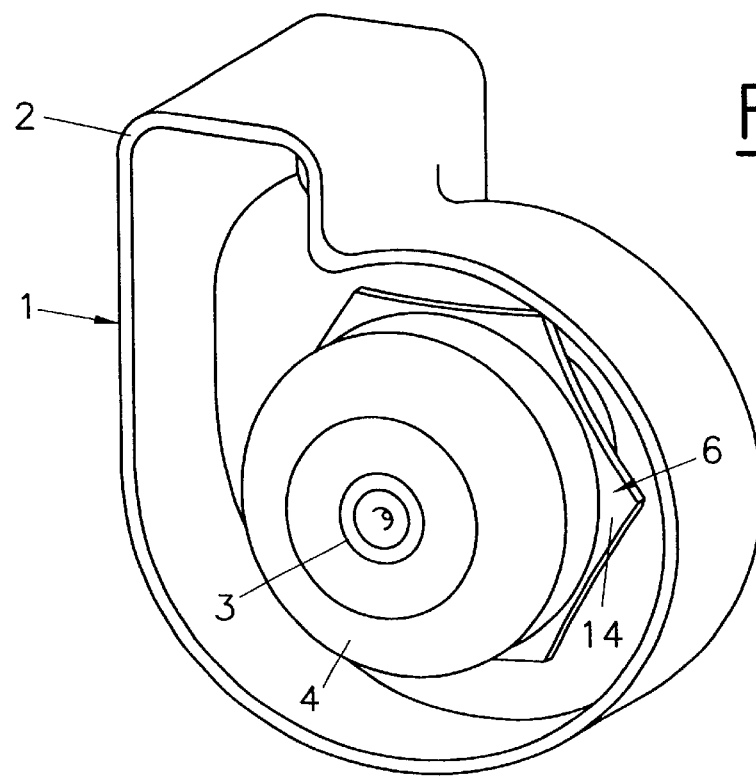
FIGS. 1 and 2 show perspective views of the water pump in accordance with the invention.

The centrifugal pump 1 is provided with a pump housing 2 in which an impeller 4 is rotatably held on a shaft. The pressure joint is designated with reference numeral 2a. The bearing 5, which is arranged as a roller bearing, is inserted into a bearing holder 6 which is detachably fastened to a cylindrical receiving area 7 of the pump housing 2. The bearing holder 6 is provided with a substantially cylindrical pipe section 8 with a cylindrical inner jacket 9 into which is pressed the outer ring 10 of the bearing 5. On the side facing the impeller 4, the bearing holder 6 is provided with a support collar 11 whose face 11a rests on the receiving zone 7.

On the side facing the impeller 4, an axial face seal 16 is pressed into the bearing holder 6, which axial face seal is used to seal off the bearing 5 from the impeller 4.

In the embodiments shown in FIGS. 1 through 6, the bearing holder 6 is screwed into the receiving zone 7 of the pump housing 2. The outside jacket 12 of the pipe section 8 is provided for this purpose with an outside thread 13. In order to enable a rapid assembly or disassembly of the bearing holder 6 on the pump housing 2, the bearing holder 6 is provided on the side facing the impeller 4 with an umbrella-like assembly part 14 which is provided in the embodiment with a positive-locking zone 15 arranged as a hexagon. The positive-locking zone 15 is arranged in such a way that a tool such as a socket wrench can be placed on the assembly part 14 by way of the impeller 4. The positive-locking zone 15 must be spaced at least so far away from the rotational axis 3a of the shaft 3 as the largest radius A of the wheel rim 4a of the impeller 4. The assembly part 14 is provided with a face surface 14a which is inclined towards the normal plane 3b from the shaft axis 3a.

Figure 2:
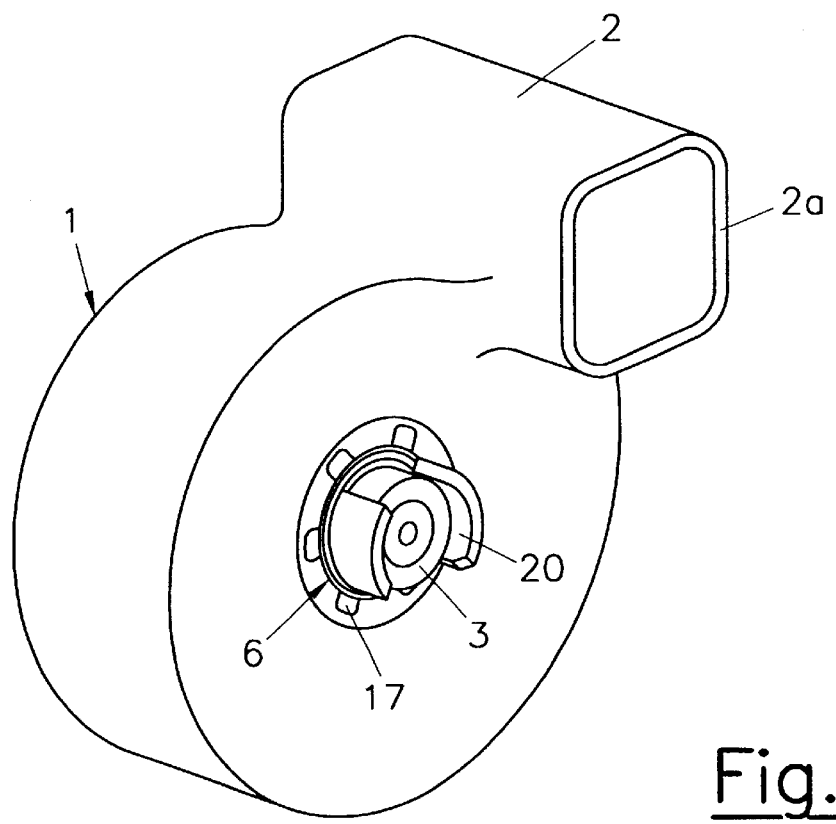
Figure 3:
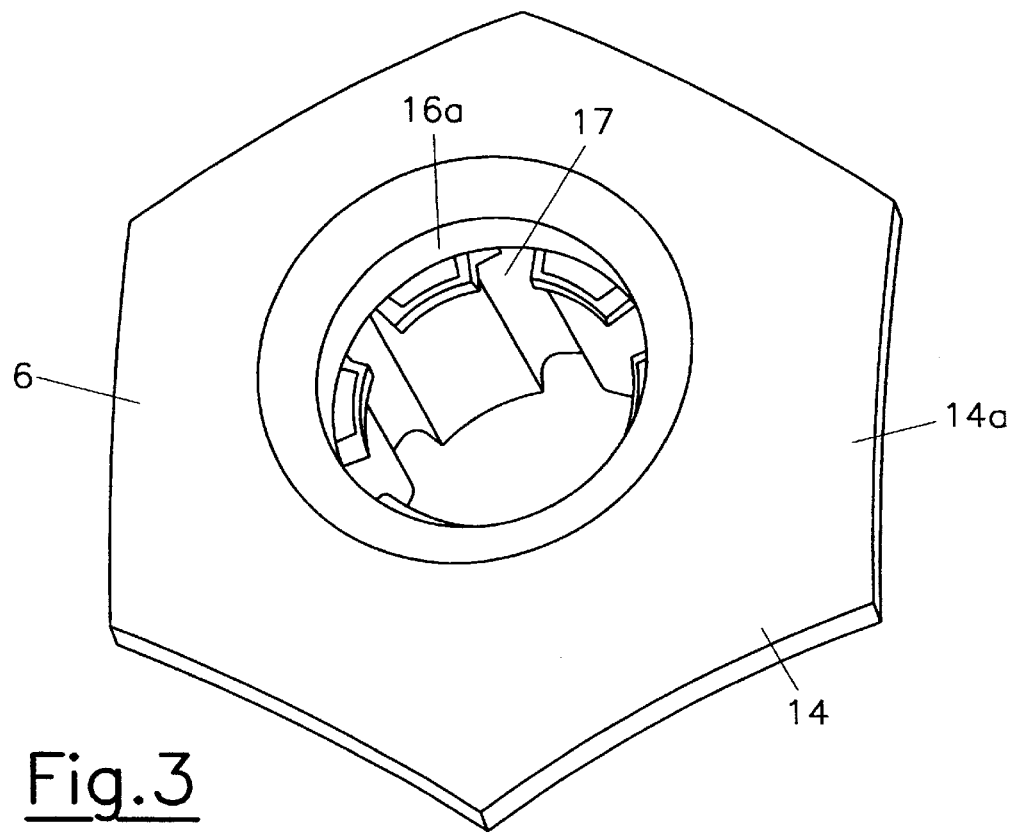
FIGS. 3 and 4 show perspective views of the bearing holder of the water pump in accordance with the invention.
Figure 4:
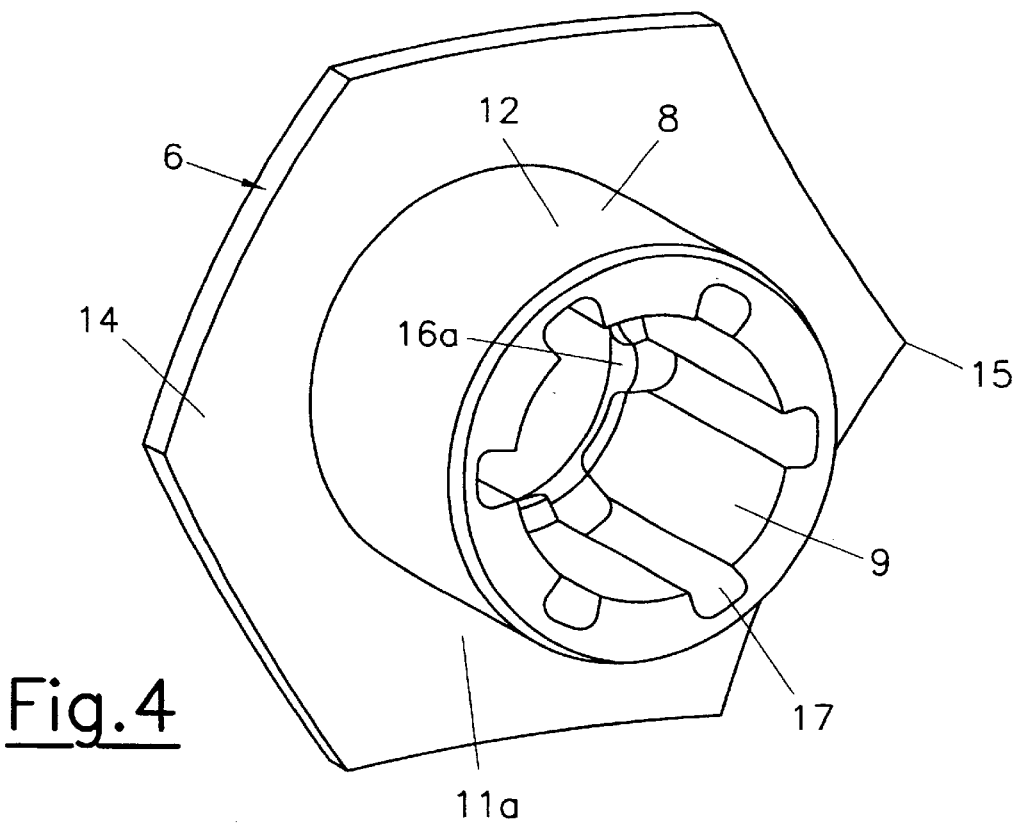
Figure 5:
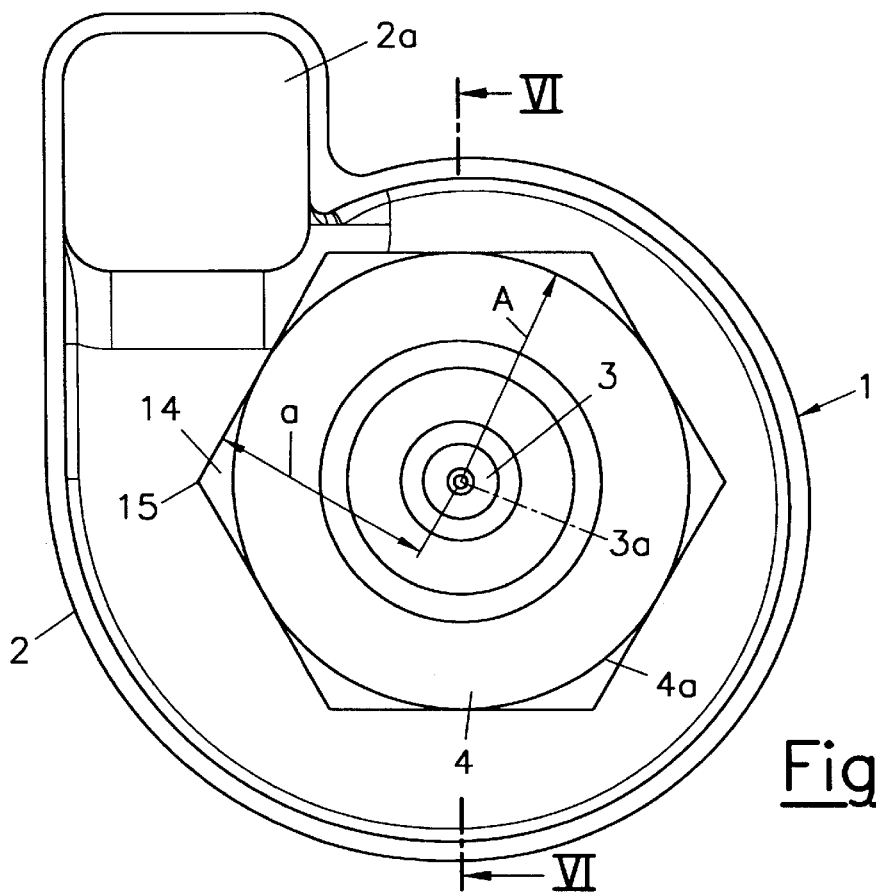
FIG. 5 shows a front view of the water pump in accordance with the invention with a lifted housing lid.
Figure 6:
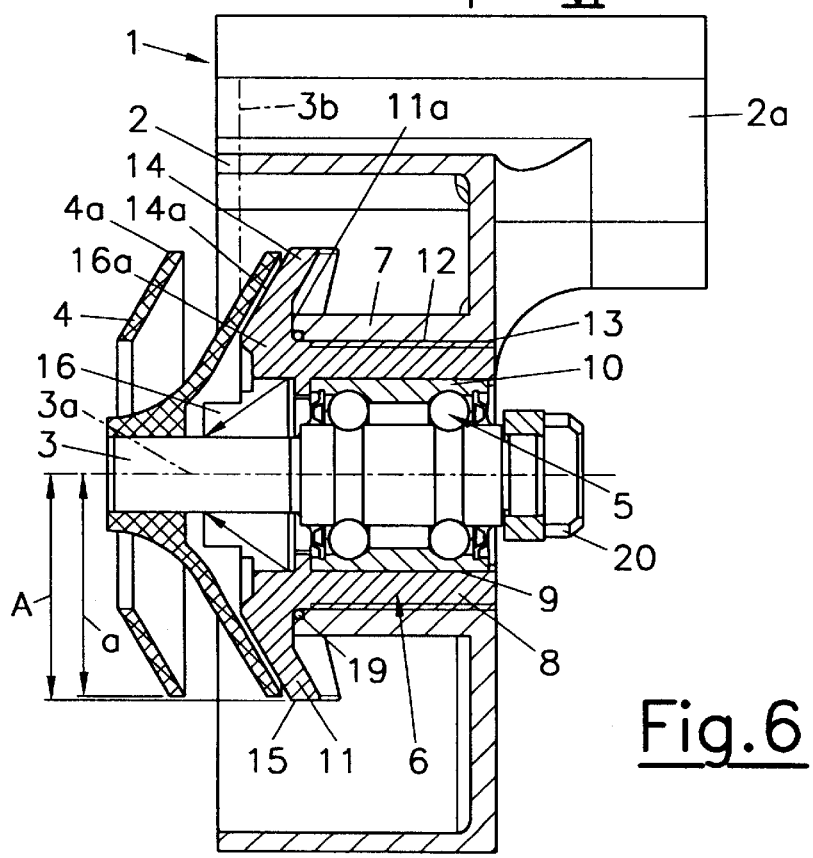
FIG. 6 shows the water pump in a sectional view according to line VI—VI in FIG. 5.

Apart from the purpose of receiving bearing 5 and the axial face seal 16, bearing holder 6 is additionally used to discharge leakage flows from the axial face seal 16 outside of the pump housing 2. For this purpose the inside jacket 9 of pipe section 8 of the bearing holder 6 is provided with several leakage ducts 17 which are distributed evenly over the circumference and are designed as axial grooves, as is shown in FIGS. 2 through 4. As a result of the plurality of leakage ducts 17, it is ensured that the leakages can be discharged reliably, even if the end position of the leakage ducts 17 is not clearly predetermined when bearing holder 6 is screwed in.

Bearing holder 6 can also be inserted into pump housing 2 by way of a rapid action coupling instead of an external thread 13.

Figure 7:
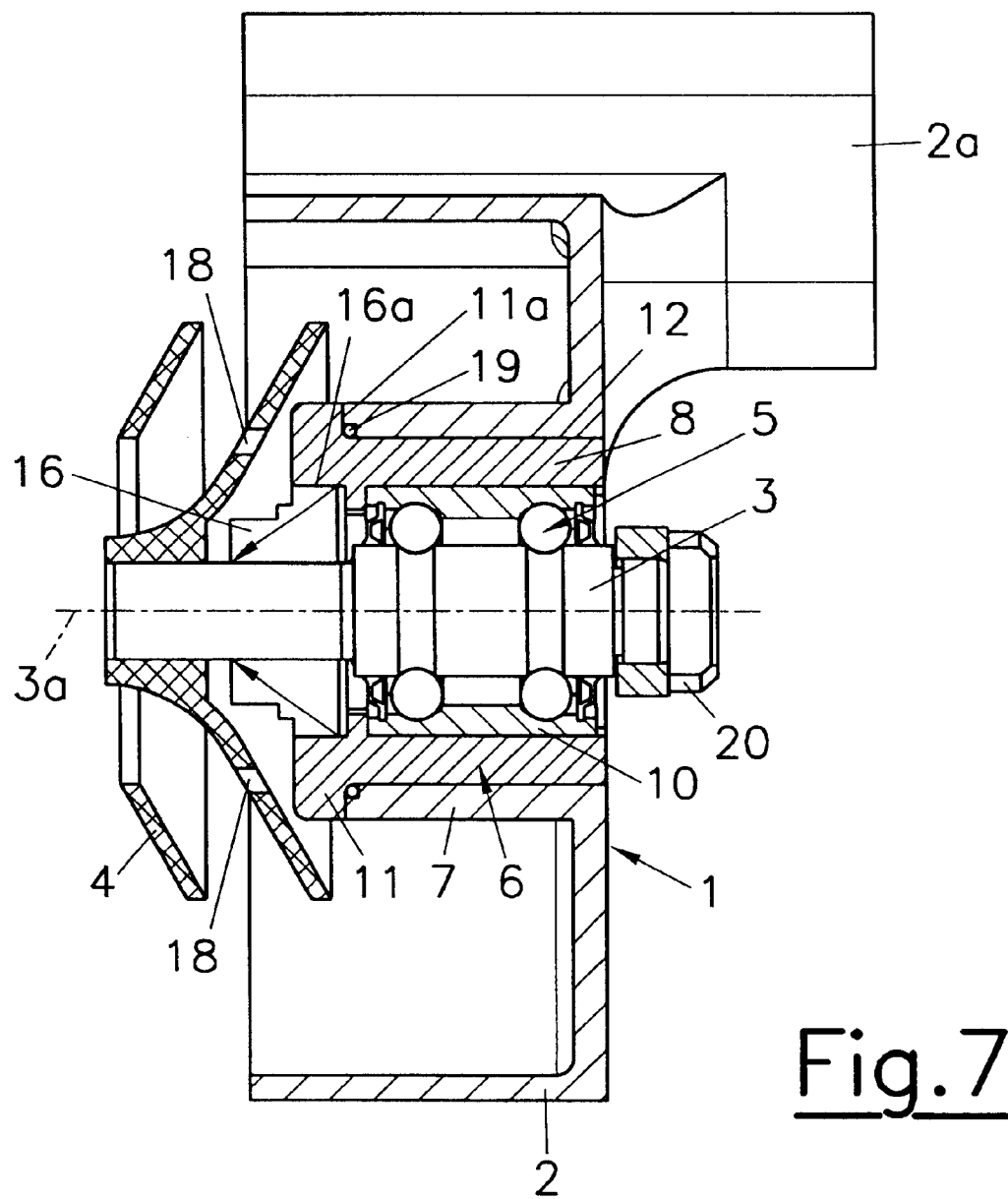
FIG. 7 shows the water pump in accordance with the invention in an embodiment in a sectional view in analogy to FIG. 6.

As an alternative to a positive-locking connection between the bearing holder 6 and the pump housing 2, the bearing holder 6 can also be pressed into the receiving zone 7 of the pump housing 2, as is indicated in FIG. 7 of the exhibited embodiment. For the purpose of placing a pressing tool on the receiving collar 11 of the bearing holder 6, the impeller 4 is provided with several mounting openings 18 which are sealed after the performed assembly by way of a sealing means (not shown in closer detail) such as an O-ring or a sealing lacquer. The outside jacket 12 of the pipe section 8 can also be designed with a loose fit instead of a press fit between the bearing holder 6 and the receiving zone 7. The protection against torsion can be performed by additional securing screws.

In order to seal off the bearing holder 6 from the pump housing 2, a sealing means arranged as an O-ring 19 for example is provided in the zone of the receiving collar 11. The sealing means can also be a sealing lacquer or a microencapsulation of the screw thread.

Reference numeral 20 designates a coupling for connecting a drive device for the shaft 3.

In the embodiment, the pump housing 2 is formed by the spiral housing portion of the centrifugal pump 1.

The explained embodiment leads to the advantage that the unit consisting of impeller 4, shaft 3, bearing 5 and bearing holder 6 can be produced and assembled independent of the pump housing 2 and is detachably connected as a whole with the pump housing 2. This allows exchanging the unit if need be without having to simultaneously exchange the entire pump housing. The pump housing 2 can thus be provided with an integral design in combination with a larger machine part, e.g. in integral design with the oilpan of an internal combustion engine. The bearing holder 6, which is preferably made of metal, ensures that the bearing heat can dissipate quickly and independently of the material of the ambient spiral housing 2. This ensures a high flexibility in the choice of the material of the pump housing 2, so that in addition to various light metals such as aluminum, magnesium or the like, plastic can also be used for the same.

What is claimed is:

1. A centrifugal pump with an impeller which is arranged in a pump housing and which is driven by a shaft which is rotatably held in the pump housing by way of at least one bearing, with the bearing being arranged in a bearing holder which is detachably connected with the pump housing, wherein the bearing holder, at an end facing the impeller, comprises an assembly part and wherein the assembly part is provided with a positive-locking zone as a working surface for a tool, with a smallest distance of the positive-locking zone from a shaft axis being larger than a largest radius of the impeller.

2. The centrifugal pump according to claim 1, wherein the bearing is a roller bearing.

3. The centrifugal pump according to claim 1, wherein the bearing holder comprises a substantially cylindrical pipe section for receiving the bearing.

4. The centrifugal pump according to claim 3, wherein the assembly part is one piece with the pipe section.

5. The centrifugal pump according to claim 4, wherein the pipe section is provided with a thread on its outside jacket.

6. The centrifugal pump according to claim 3, wherein for receiving the bearing an inside jacket of the pipe section is arranged as a press fit and the bearing is pressed into the pipe section.

7. The centrifugal pump according to claim 3, wherein the inside jacket of the pipe section is provided with at least one leakage duct arranged as an axial groove.

8. The centrifugal pump according to claim 3, wherein the inside jacket of the pipe section is provided with several leakage ducts which are evenly distributed over the circumference and are arranged as axial grooves.

9. The centrifugal pump according to claim 3, wherein the outside jacket of the pipe section is provided with a press fit and the bearing holder is pressed into a cylindrical receiving zone of the pump housing.

10. The centrifugal pump according to claim 3, wherein the outside jacket of the pipe section is provided with a loose fit and the bearing holder is pushed into the cylindrical receiving zone of the pump housing.

11. The centrifugal pump according to claim 1, wherein the positive-locking zone is formed by a hexagon.

12. The centrifugal pump according to claim 1, wherein the assembly part is provided with a face surface which is inclined towards the pipe section with respect to a normal plane from the shaft axis.

13. The centrifugal pump according to claim 1, wherein a sealing element is pressed into the bearing holder in a zone of an impeller-side end of the bearing holder.

14. The centrifugal pump according to claim 13, wherein the sealing element is an axial face seal.

15. The centrifugal pump according to claim 13, wherein the bearing holder is provided in a transition zone between pipe section and assembly part with a collar onto which the sealing element is pressed.

16. The centrifugal pump according to claim 1, wherein the bearing holder is provided with a support collar in the zone of the impeller-side end.

17. The centrifugal pump according to claim 1, wherein the bearing holder is sealed off from the receiving zone of the pump housing by a sealing means.

18. The centrifugal pump according to claim 17, wherein the bearing holder is sealed off from the receiving zone in the zone of the impeller-side end.

19. The centrifugal pump according to claim 17, wherein the bearing holder is secured against torsion by the sealing means.

20. The centrifugal pump according to claim 17, wherein the sealing means is formed by a sealing lacquer.

21. The centrifugal pump according to claim 17, wherein the sealing means is formed by a microencapsulation or an O-ring seal.

22. The centrifugal pump according to claim 1, wherein several axial mounting openings are formed into the impeller for mounting the bearing holder.

23. The centrifugal pump according to claim 22, wherein the mounting openings are formed into the impeller in the zone of the supporting collar.

24. The centrifugal pump according to claim 22, wherein the mounting openings are sealed off by sealing means.

25. The centrifugal pump according to claim 1, wherein the bearing holder is arranged in the spiral housing of the pump housing.

* * * * *